United States Patent [19]

Ide

[11] Patent Number: 5,213,421
[45] Date of Patent: May 25, 1993

[54] VACUUM BELT DRIVE TRAIN AND BEARING THEREFOR

[76] Inventor: Russell D. Ide, 122 Ridge Dr., Exeter, R.I. 02822

[21] Appl. No.: 825,026

[22] Filed: Jan. 24, 1992

Related U.S. Application Data

[62] Division of Ser. No. 656,238, Feb. 15, 1991.

[51] Int. Cl.$^5$ .................... F16C 23/02; F16C 27/02
[52] U.S. Cl. ..................................... 384/192; 384/215
[58] Field of Search .............. 389/192, 202, 215, 252, 389/247, 256, 257, 295, 308–310, 312, 416, 417, 428, 535, 581

[56] References Cited

U.S. PATENT DOCUMENTS

| | | | |
|---|---|---|---|
| 1,991,461 | 2/1935 | Howarth | 384/306 |
| 2,110,464 | 3/1938 | Kingsbury | 384/308 |
| 2,159,545 | 5/1939 | Bartosch | 384/215 |
| 2,314,703 | 3/1943 | Howarth | 384/308 |
| 2,347,663 | 5/1944 | Carnahan | 384/117 |
| 2,424,028 | 7/1947 | Haeberlein | 384/223 |
| 2,936,141 | 5/1960 | Rapata | 384/215 |
| 3,107,955 | 10/1963 | Trumpler | 384/302 |
| 3,132,908 | 5/1964 | Grotzinger | 384/308 |
| 3,142,519 | 7/1964 | Abramovitz | 384/308 |
| 3,160,450 | 12/1964 | Gentiluomo | 384/308 |
| 3,185,532 | 5/1965 | Loch | 384/215 |
| 3,384,425 | 5/1968 | Brown | 384/12 |
| 3,586,401 | 6/1971 | Gravelle | 384/308 |
| 3,604,765 | 9/1971 | Babcock | 384/192 |
| 3,677,612 | 7/1972 | Barnett et al. | 384/12 |
| 3,971,602 | 7/1976 | Anderson | 384/104 |
| 4,005,914 | 2/1977 | Newman | 384/103 |
| 4,099,799 | 7/1978 | Etsion | 384/12 |
| 4,227,752 | 10/1980 | Wilcock | |
| 4,335,925 | 6/1982 | Stopp | |
| 4,496,251 | 1/1985 | Ide | 384/117 |
| 4,655,614 | 4/1987 | Schott | 384/215 X |
| 4,657,411 | 4/1987 | Bath | 384/308 X |
| 4,668,106 | 5/1987 | Gu | 384/105 |
| 4,671,677 | 6/1987 | Heshmat et al. | 384/124 |
| 4,676,668 | 6/1987 | Ide | 384/117 |
| 4,699,525 | 10/1987 | Mizobuchi et al. | 384/112 X |
| 4,726,695 | 2/1988 | Showalter | 384/121 |
| 4,738,453 | 4/1988 | Ide | 277/81 R |
| 4,738,550 | 4/1988 | Gardner | 384/308 X |
| 5,112,143 | 5/1992 | Ide | 384/117 |
| 5,137,373 | 8/1992 | Ide | 384/117 |

FOREIGN PATENT DOCUMENTS

| | | |
|---|---|---|
| 0206686 | 12/1986 | European Pat. Off. |
| 1010959 | 6/1952 | France |
| 222818 | 7/1968 | U.S.S.R. ........................ 384/192 |
| 879116 | 10/1961 | United Kingdom |

*Primary Examiner*—Thomas R. Hannon
*Attorney, Agent, or Firm*—Marks & Murase

[57] ABSTRACT

A belt drive train particularly useful for driving the beater bar of a vacuum cleaner. The drive train includes a driven shaft preferably driven by a motor, a drive shaft preferably connected to a beater bar and including a driven pulley, and an inelastic belt coupling the drive shaft to the driven shaft. Both the drive shaft and the driven shaft are supported on bearings. At least one of the bearing is mounted in a deflecting bearing mount so that the shaft supported by the bearing can be moved relative to the housing. As a result of this construction, the drive shaft and the driven shaft can be moved closer to one another to allow the inelastic belt to be passed over the drive shaft and the driven shaft. The elasticity of the deflecting bearing mount then causes a belt tension sufficient to allow the drive shaft to drive the driven shaft through the belt. The drive train can also include one or more self aligning sleeve bearings to compensate for the unbalanced belt tension force. The sleeve bearings include a shaft support surface, an outer periphery and a deflecting element supporting the shaft support surface on the outer periphery.

20 Claims, 4 Drawing Sheets

VACUUM BELT DRIVE TRAIN AND BEARING THEREFOR

FIELD OF THE INVENTION

This application is a division of application S.N. 07/656,238 filed Feb. 15, 1991.

The present invention relates to an improved bearing and bearing mount for a belt driven system. The improved support is particularly useful in supporting the motor shaft and brush roller shaft of a conventional stand up type vacuum cleaner.

BACKGROUND OF THE INVENTION

Many stand-up type vacuum cleaners have a power head unit which includes a rotating brush driven by an electric motor via an elastic belt which is typically formed of rubber or the like. An example of a conventional system is shown in FIG. 1.

As shown in FIG. 1, the power head includes a housing 10, wheels (not shown), a suction hose which enters through an outlet 14, an electric motor 20 secured to the housing by mounting screws 23, and a brush roller or beater bar 30. A pair of shafts ends 32 extend outward from the axial ends of the beater bar 30. Each shaft end 32 is supported in a mounting plate 37 secured in a mounting groove 36 via rubber mounts 35. Typically a brush roll pulley 33 is rotatably secured to a shaft end 32 which is predictably referred to as the pulley end. A motor drive 27 extends from the motor 20. An elastic belt 40 loops around the motor drive shaft 27 and the brush roll pulley 33. Typically, the brush roll pulley 33 has a larger diameter than the motor drive shaft 27 so that the brush roll or beater bar 30 rotates at a slower rate but higher torque than the motor drive shaft. A speed reduction (torque increase) ratio of about 4:1 is normal. If the belt 40 has sufficient tension it will transfer rotation of the motor shaft 27 into rotation of the brush roll pulley 33 and hence the brush roll 30 in the known manner. In such a case, the shaft 27 is a drive shaft and the shaft ends 32, beater bar 30 and pulley 33 constitute a driven shaft.

In order to provide the necessary tension an elastic or stretch type belt is typically used. Such a belt is advantageous because it is self tensioning. However, such belts also present problems. Most notably, known stretch type belts experience inelastic stretching or deformation over time as a result of age and wear. For example a typical belt in a known system can experience an increase in length of up to 0.25 inches over time. As the belt lengthens, its tension decreases. For example, it is know that the tension on the rubber belt in one conventional vacuum can decrease from 24 pounds to 12 pounds as a result of manufacturing tolerances and age.

In order to make sure that the belt will still have sufficient tension to drive the beater bar after lengthening, the initial tension of the belt is designed to be well above the tension required to drive the brush roll beater bar 30. Thus, in the example given above, if 12 pounds of tension is sufficient, the initial tension (24 pounds) is twice the necessary tension. Consequently, a needlessly large unbalanced force is applied to the shafts 27 and 32. The action of this force F on the motor shaft 27 and shaft ends 32 is shown in FIG. I. A higher belt tensioning force causes excess load on the bearings resulting in premature wear and failure of the bearings in the drive motor and brush roller. In most applications, a ball bearing 5 must be used in the heavy load side of the motor (the side adjacent the belt 40) because of the magnitude of these belt loads. This is expensive and life limiting. On the opposite side, a sleeve bearing 7 is used. Again, under higher loads, edge loading occurs and bearing life is limited.

Considering first the bearings in the motor, the ball bearing 5, as mentioned above, is necessary to react belt loads. The sleeve bearing 7 experiences high edge loads and often fails. Also, in the case of plastic sleeve bearings, the bearings seize because of thermo expansion due to frictional heat generated by high loads. Similarly, the shaft ends 32 of the beater bar or brush roll 30 are typically mounted in sleeve bearings 7 or expensive ball bearings. If sleeve bearings are used, they experience high edge wear because of the unbalanced belt tension force. Thus, it can be seen that there is need for an improved bearing and bearing support for a belt driven system of this type.

This application relates, in part, to a belt driven system in which plastic sleeve bearings can be used instead of expensive ball bearings. The principal limitation in a plastic sleeve bearing's performance is the so-called PV limit. For instance, high edge loading causes a plastic sleeve bearing to reach its PV limit. PV is the product of load or pressure (P) and sliding velocity (V). A plastic bearing subjected to increasing PV loading will eventually reach a point of failure known as the PV limit. The failure point is usually manifested by an abrupt increase in the wear rate of the bearing material.

As long as the mechanical strength of the bearing material is not exceeded, the temperature of the bearing surface is generally the most important factor in determining PV limit. Therefore, anything that affects surface temperature—coefficient of friction, thermal conductivity, lubrication, ambient temperature, running clearance, hardness and surface finish of mating materials—will also affect the PV limit of the bearing.

Thus, the first step in selecting and evaluating a sleeve bearing is determining the PV limit required by the intended application. It is usually prudent to allow a generous safety margin in determining PV limits, because real operating conditions often are more rigorous than experimental conditions.

Determining the PV requirements of any application is a three step process. First, the static loading per unit area (P) that the bearing must withstand in operation must be determined. For journal bearing configurations the calculation is as follows:

$P = W/(d \times b)$ where
P = pressure, psi (kg/cm$^2$)
W = static load, lb (kg)
d = bearing surface ID, in. (cm)
b = bearing length, in. (cm)

Pressure (P) should not exceed certain maximum values at room temperature. These can be derived from a table of allowable static bearing pressure for most known materials. Next, the velocity (V) of the bearing relative to the mating surface must be calculated. For a journal bearing experiencing continuous rotation, as opposed to oscillatory motion, velocity is calculated as follows:

$V = (dN)$ where:
V = surface velocity, in/min (cm/min)
N = speed of rotation, rpm of cycles/min d=bearing surface ID, in. (cm)
Finally, calculate PV as follows:

$$PV(\text{psi-ft/min}) = P(\text{psi}) \times V(\text{in/min})12$$

or, in metric units:

$$PV(\text{kg/cm}^2\text{-m,/sec}) = P(\text{kg/cm}^2) \times V(\text{cm/min})/6000$$

The PV limits of unlubricated bearing materials are generally available from the manufacturer of the material or from technical literature. Since PV limits for any material vary with different combinations of pressure and velocity as well as with other test conditions, it is prudent to consult the manufacturer for detailed information.

One material which is particularly well suited to bearing applications is the polyamide thermoset material sold by Dupont under the trademark VESPEL TM. Properly lubricated VESPEL TM parts can withstand approximately 1 million psi-ft/min.

This application further relates to beam mounted support for the components of a vacuum head power unit. It is believed that the concept of a beam mounted support has not, to date, been applied to vacuum power heads. It is also believed that the most advanced work in the field of the deflecting beam supports is that of the present inventor. For instance, the present inventor's European Patent Application (Publication No. 0343620) describes bearings having beam mounted bearing pads and methods of making the same. In this case, the bearings are supported by deflecting beam support structures to assist in the formation of a hydrodynamic wedge between a bearing pad and a rotating shaft.

Other patents have disclosed flexible support structures for supporting hydrodynamic bearing pads. For instance, U.S. Pat. No. 3,107,955 to Trumpler discloses a bearing having beam mounted bearing pads that move with a pivoting or swing type motion about a center located in front of the pad surface. The beam support is based only on a two dimensional model of pad deflection.

U.S. Pat. No. 4,496,251 to Ide, the present inventor, discloses a bearing pad mounted on web like ligaments to deflect so that a wedge shaped film of lubricant is formed between the relatively moving parts.

U.S. Pat. No. 4,676,668, also to Ide, discloses a bearing construction which includes a plurality of discrete bearing pads supported in a carrier member. Each bearing pad includes a pad portion and a beam-like support structure for supporting the pads as desired.

As mentioned above, the support structures described in these patents has not heretofore been applied to the power head of a vacuum cleaner.

SUMMARY OF THE PRESENT INVENTION

The present invention solves the problems experienced with conventional assemblies by providing an improved bearing system and belt tensioning system for vacuum cleaner power heads. The system offers a number of advantages over conventional systems. First, it is possible to use a fixed length inelastic belt which is far more durable. Also, there is no need for high initial loading since there is no significant loss of belt tension over time (the tension is provided by a metal spring not an elastomeric band or belt). Further, there is no need to use expensive ball bearings. Inexpensive one piece bearings molded out of plastic may be used instead. The bearings can be oriented for maximum life. The bearing system is improved by allowing a deflection support structure to provide uniform loading on the bearings to automatically maintain uniform belt tension. Using a plain sleeve bearing or deflection pad bearing, a support structure can be developed that provides uniform bearing loading. If desired, the support structure can also be designed to provide the necessary belt tension. Alternatively, a separate belt tensioning support may be used.

In accordance with a preferred embodiment of the present invention, the sleeve bearings are modified to include a support structure to provide uniform loading and unrestrained thermo growth. Specifically, the plastic sleeve, or shaft support surface is provided with a deflecting support. Thus, the plastic sleeve can move to accommodate movement of the shaft it supports. This substantially eliminates the edge wear problem. The sleeve is preferably split to permit thermo expansion.

To eliminate the need for ball bearings, a substantially constant belt tension is used so that the maximum load is much lower than when an elastic belt is used. In order to maintain constant belt tension, the motor and/or the brush roller mount is spring mounted. There are several ways to do this.

For instance, in the case of the brush roller 30, the ends of the roller could be supported in deflecting pad bearings or sleeves which are in turn supported on legs or beams which can be deflected upon installation to provide the necessary tension. Of course, the deflecting pad construction should include a beam support to allow the shaft support surface, either a sleeve or deflecting pad bearing to move to accommodate changes in shaft orientation. Alternatively, the motor and drive shaft can be mounted on a cantilever type support to allow the necessary deflection.

Presently, however, it is believed that to ensure commercial acceptance, the belt tension system should be easily adaptable to constructions. Thus, in the preferred embodiment, a separate tensioning system is used. If a separate system is to be used, it is best developed in the existing mounting plates 37. Currently, the mounting plates include a metal plate which supports a bearing, the periphery of the metal plate is mounted in mounting grooves 36 via rubber vibration mounts 35. According to the present invention, a support structure is added in the mounting plate. The bearing is thus supported for deflection with respect to the periphery of the mounting plates. A belt tensioning system can thus be economically provided.

Specifically, the present invention provides a belt drive train comprising a housing, a drive shaft, a driven shaft, an inelastic belt rotatably coupling the drive shaft and the driven shaft; at least two bearings supporting the drive shaft in the housing for rotation; at least two bearings supporting the driven shaft in the housing for rotation; at least one deflecting bearing mount for supporting at least one of the bearings, the deflecting bearing mount including a bearing support surface which is elastically movable relative to the housing; at least one of the bearings comprising a self-aligning sleeve bearing having a shaft support surface, an outer periphery and at least one beam-like member connecting the shaft support surface to the outer periphery so that the shaft support surface can deflect relative to the outer periphery to alter the alignment of the shaft support surface.

One advantage of this system is that the use of the belt tensioning system allows elimination of the ball bearings.

DETAILED DESCRIPTION

Figure 1:
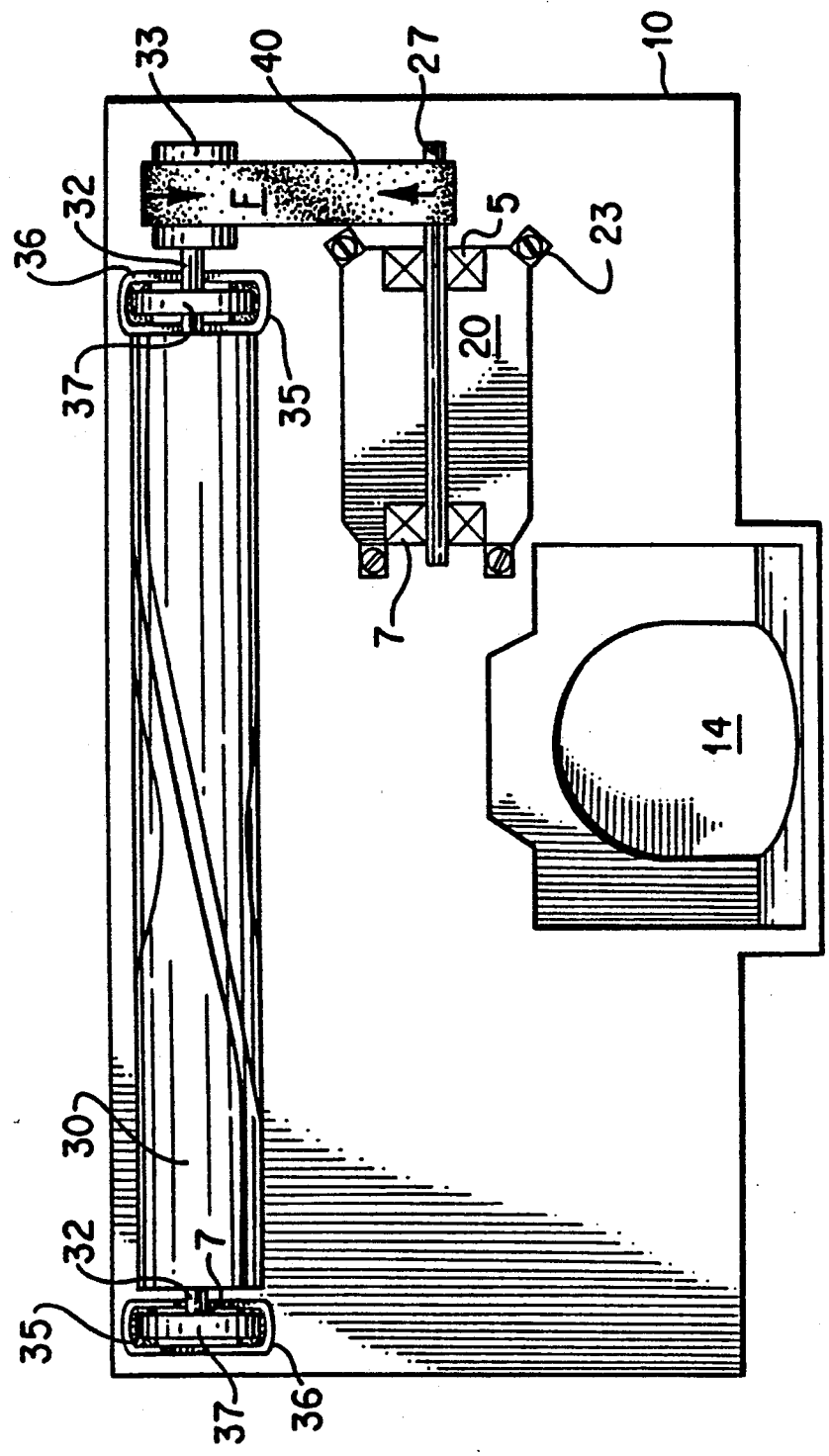
FIG. 1 is a bottom view of a conventional vacuum drive assembly.
Figure 2:
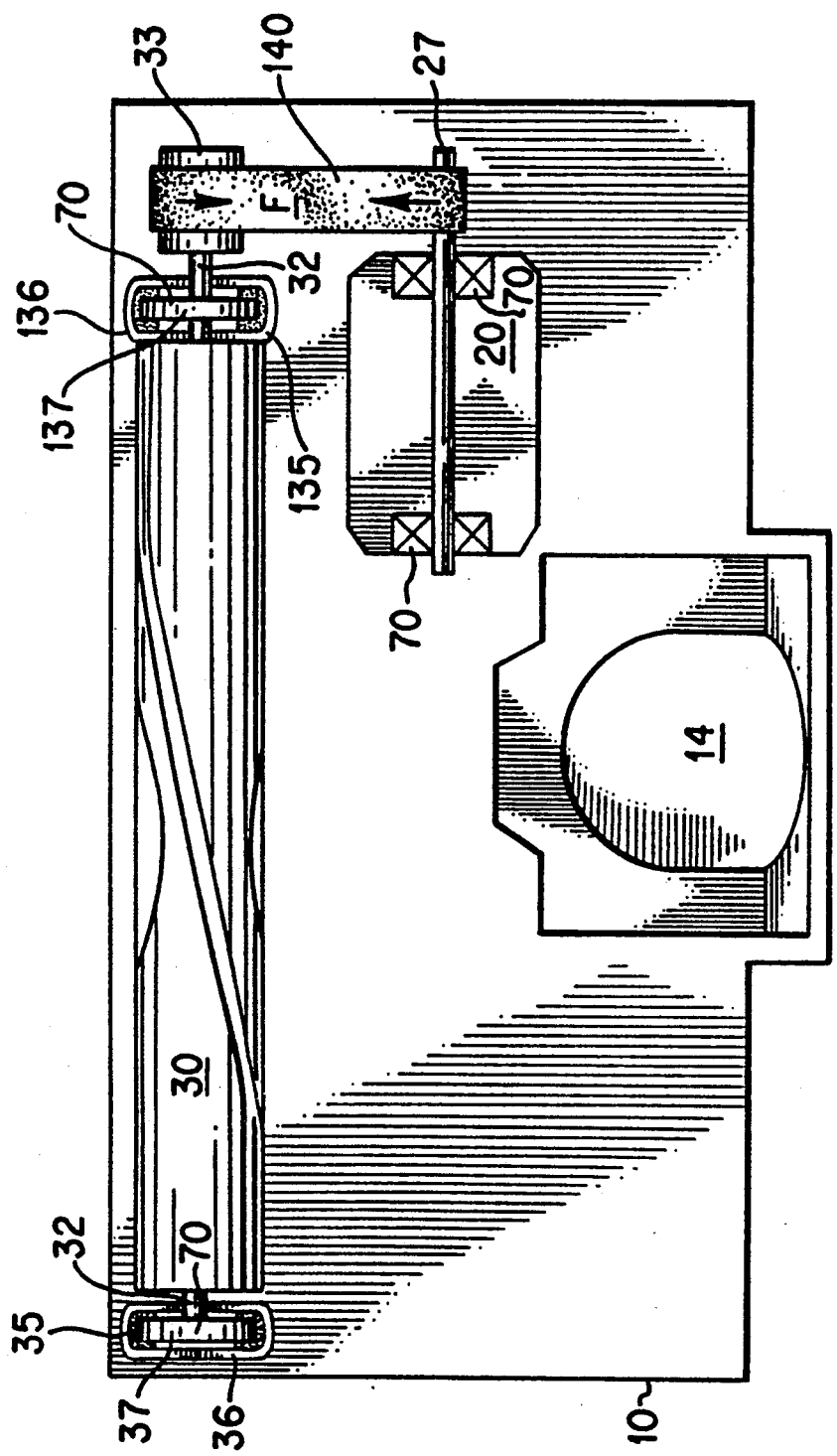
FIG. 2 is a bottom view of a vacuum drive assembly according to the present invention.

FIG. 2 shows a bottom view of a vacuum belt drive in accordance with one embodiment of the present invention. As is apparent by comparing FIG. 2 with FIG. I, this embodiment is easily adapted to conventional vacuum belt drive of the type shown in FIG. 1. In particular, the differences between the drives assembly of FIG. 2 and that of FIG. 1 reside in the mounting plates 137 for supporting the brush roll or beater bar 30 and the bearing 70 used to support the motor drive shaft 27 and the shaft ends 32 of the brush roller beater bar 30. Also, the belt 140 is of a fixed length, inelastic type.

Functionally, the major difference between the assembly shown in FIG. 2 and the conventional assembly shown in FIG. 1 is that belt tension is created by the use of a beam mounted shaft support plate instead of by the use of an elastic belt. Consequently, there is no need to initially over tension the drive system. Thus, the loads experienced are less than those experienced in a conventional system thus reducing wear. Also, the sleeve bearings 70 are a self-adjusting type so that the orientation of the sleeve surface is adjustable so that the shaft load acts across the entire sleeve surface so that edge wear does not occur. Preferably, the sleeve bearings are constructed of a material having a high PV limit such as VESPEL ™.

Figures 3A, 3B:
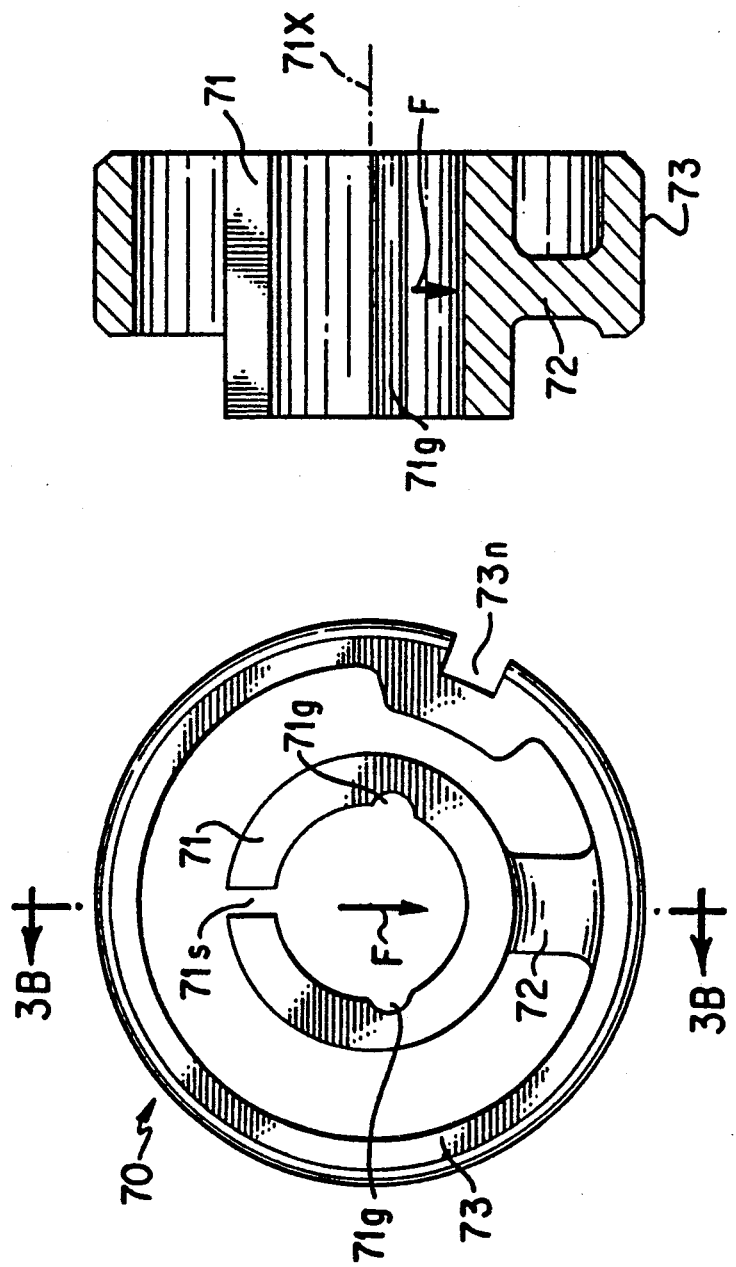
FIG. 3A is a front view of a self-adjusting sleeve bearing according to the present invention.
FIG. 3B is a side cross-section of a shelf adjusting sleeve bearing according to the present invention.

The details of the self-adjusting bearing 70 of the present invention are shown in FIGS. 3A and 3B. As shown, the bearing 70 comprises a sleeve portion 71, a radially extending ligament 72 supporting the sleeve portion 71 and an outer support surface 73 supporting the ligament 72. As best shown in FIG. 3B the ligament 72 is thin in the axial direction, and, as shown in FIG. 3A, the ligament 72 is relatively narrow in the circumferential direction. Accordingly, the ligament provides a relatively flexible support for the sleeve portion 71. Thus, that the axis 71X of the sleeve portion can be oriented so as to align itself with the axis of the shaft portion supported in the sleeve. In this way, the load applied by the shaft is applied equally across the surface of the sleeve 71 thus avoiding edge wear.

The belt tension force, indicated at F, acts radially along the ligament 72. This ensures the rigidity of the support in the direction of the tensioning force so that the support does not cause slackness of the belt.

The flexible support of the sleeve portion 71 can be achieved by support elements other than a ligament of the type shown as 72 in FIGS. 3A and 3B. If desired, the sleeve 71 can be supported by a multi-beam support of the type shown in applicant's previous patents including U.S. Pat. Nos. 4,496,251, 4,676,668, and 5,112,143, the disclosures of which are herein incorporated by reference. However, in this case, it is believed that the simple radial ligament support which allows adjustment of the axis 71x of the sleeve 71 is sufficient to insure long life of the sleeve 71.

As described heretofore, the sleeve bearing of the present invention is believed to be a significant improvement over the sleeve bearings used in existing vacuum drive assemblies. However, further improvements are possible. A number of these improvements are illustrated in FIG. 3A. Specifically, the sleeve 71 may be split as indicated at 71s to allow thermo expansion of the sleeve. The split 71s should be radially opposite the ligament 72 so that when the shaft loading force F is applied, the split 71s does not structurally weaken the sleeve 71.

Another preferred feature is the provision of one or more grooves 71g in a surface of the sleeve 71. The primary function of these grooves 71g is to provide straight paths to kick out debris between the shaft and the sleeve surface. This debris, if left in place, could cause rapid wear of the sleeve surface.

Further, as shown in FIG. 3A, the sleeve 71 is spaced a substantial distance from the outer support surface 73. As a result, a significant amount of air can flow between the outer surface of the sleeve 71 and the inner surface of the outer support surface 73. It is particularly desirable to allow such an air flow to cool the motor in the bearings supporting the motor.

As mentioned before, it is important that the force F acting on the self-adjusting bearing 70 act radially along the support ligaments 72. Accordingly, when the bearing 70 is assembled into the drive assembly, it must be positioned such that the force acts in the intended direction as shown at F in FIG. 3A. There are several ways to obtain precise positioning of the self-adjusting bearing 70. For example, a notch 73n may be provided in the outer support surface 73 as shown in FIG. 3A. This notch 73n receives a locating projection in the bearing support surface to precisely orient the self-adjusting bearing 70 in the assembled state. Alternatively, the outer support surface 73 of the self-adjusting bearing 70 could be non-cylindrical such that it would only fit in the housing when properly positioned. In particular, the outer surface could be rectangular, triangular or any other suitable non-cylindrical shape. In some cases, the use of such a non-cylindrical shape might inhibit air flow which, as mentioned above, is sometimes important. The bearing is preferably constructed of a high performance bearing plastic. Most preferably VESPEL ™ the polyamide thermoset material sold by Dupont. This material has extremely good wear characteristics.

Figures 4A, 4B, 4C:
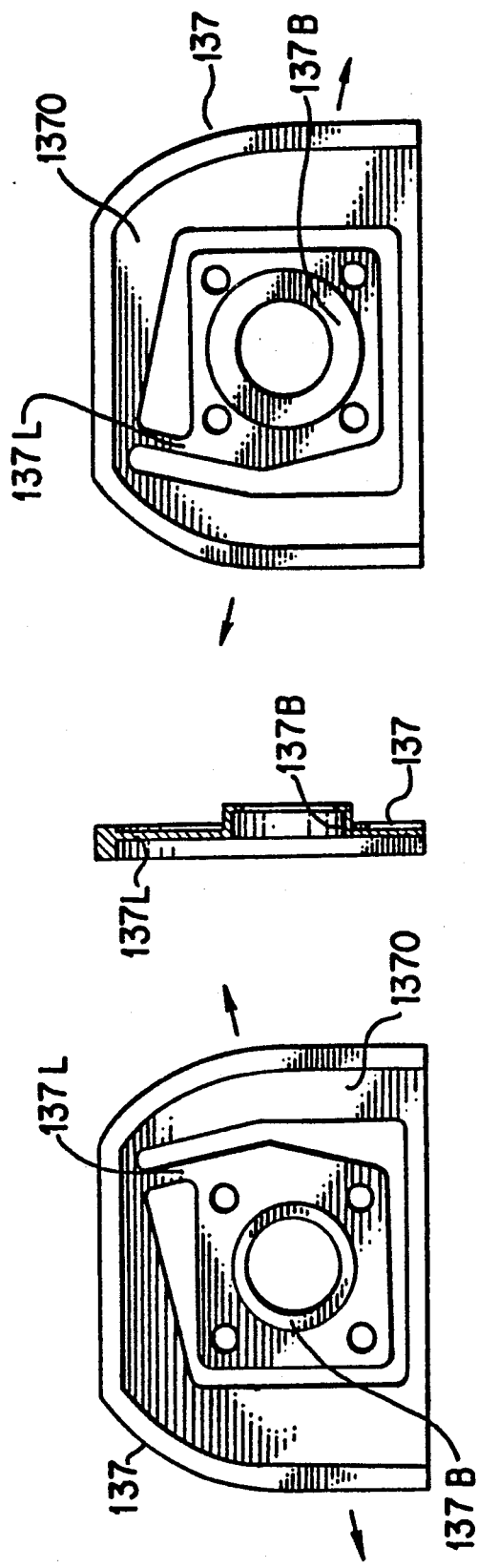
FIG. 4A is a front view of a beam mounted bearing mount plate according to the present invention.
FIG. 4B is an end of view of the bearing mount plate of FIG. 4A.
FIG. 4C is a back view of the bearing mount plate of FIG. 4A.

The details of the beam mounted bearing mount or support plate used in the assembly shown in FIG. 2 are shown in FIGS. 4A, 4B, and 4C. As shown therein, the mount plate 137 has a shape similar to that of a conventional mounting plate of the type shown at 37 in FIG. 1. Of course, this specific shape is not required, but it is useful in designing a system which is easily adapted to existing vacuum drive assemblies.

The support plate includes an axially extending bearing support surface 137B for supporting a sleeve bearing, a ball bearing, or, according to the present invention, a self-adjusting sleeve bearing of the type described above. It is also possible that the sleeve bearing or self-adjusting sleeve bearing could be formed integrally with the support plate. However, this is not preferred. The support surface 137B is connected to the outer periphery of the support plate 137 by a thin flexible ligament 137L. The primary flexibility of the ligament 137L is in the plane of the paper along the line of action by arrows indicated in FIGS. 4A and 4C. In the embodiment shown, the ligament does not offer a great deal of flexibility out of the plane of the paper since this is not believed necessary. However, if desired such flexibility could be designed in accordance with principles discussed in applicant's above mentioned patents relating to beam mounted supports which, are incorporated by reference above.

As a result of the flexible support of the bearing support surface 137B by the flexible ligament 137L, the belt tension necessary to allow driving of the brush roll pulley 33 by the motor shaft 27 can be achieved without the use of an elastic belt. Specifically, the ligament 137, not the belt, is elastically flexible such that when assembled, the ligament 137L is deflected from its normal position. Since the ligament 137L is elastic, it tends to deflect back to its original position creating a tension on the belt 140.

Preferably, the support plate 137 is formed of a metal. Metal obviously retains its elasticity to a much greater extent than rubber which is typically used in elastic belts. Accordingly, there is no significant change in the elastic characteristic of the ligament 137L during the life of the vacuum cleaner. It follows that the tension characteristics of the system will not change. Therefore, it is not necessary to overtension the belt. Also, as can be appreciated, there is no need to use an elastic belt since the belt tension is provided by the support plate 137. Thus, it can be seen that the mounting plate 137 shown in FIGS. 4A, 4B and 4C provides a spring-type mounting for the beater bar.

From the above, it can be appreciated that the present invention provides a simple system for dramatically improving the performance of a vacuum belt drive system. These improvements result from the combination of using a spring-type beater bar support and self-aligning cantilever support bearing. These elements can be used in various parts of the vacuum belt drive system. It is critical, in accordance with the preferred embodiment of the present invention that a spring-type bearing support 137 be used to support bearing which supports the shaft end 32 adjacent to the brush roll pulley 32. It is not, however, essential that a spring-type bearing mount or support be used at the bearing at the opposite end. However, this is certainly possible, if desired. Similarly, it is most important to use a self-aligning cantilever-type bearing 70 at the end of the motor shaft 27 furthest from the belt 140. However, it is also advantageous to use a self-adjusting bearing 70 to support the end of the motor shaft 27 closest to the belt 140 for, among other reasons, allowing air flow into the motor. The cantilever-type adjusting bearing should also be at the shaft end 32 of the brush roll or beater bar 30 furthest from the pulley. If desired, the self-adjusting bearing can also be used in connection with the spring-mounted support 137 used at the pulley end. However, care should be taken to insure that the flexibility of the cantilever bearing support does not interfere with the belt tensioning force created by the spring-mounted support 137.

As mentioned earlier, other ways of generating tension on the belt are possible. For instance, the motor 20 can be mounted on a cantilever-type frame to generate the necessary tension. Alternatively, the beater bar or brush roll 30 can be mounted in bearing having a cantilever element to provide the requisite tension. While these types of support may be appropriate for a newly designed vacuum drive system they are not as readily adaptable to existing systems. Accordingly, the system described above is believed better for that purpose.

What is claimed is:

1. A self aligning plastic sleeve bearing comprising:
   a substantially cylindrical plastic sleeve having a cylindrical shaft supporting interior surface and an exterior surface;
   an outer support housing radially spaced from and surrounding the plastic sleeve; and
   a single radially extending ligament extending between the plastic sleeve and the outer support housing so as to support the plastic sleeve for movement relative to the outer support housing to accommodate shaft misalignment.

2. The bearing of claim 1, wherein the bearing is a sleeve bearing having a single bearing support surface and a single ligament that supports the bearing support surface on the outer support surface.

3. The bearing of claim 1, wherein the bearing support surface is split at a point circumferentially located opposite the beam-like ligament.

4. The bearing of claim 1, wherein the support surface of the bearing includes at least one axially extending groove to allow kicking out of debris during operation.

5. The bearing of claim 1, wherein the bearing support surface, at least one beam-like ligament and the outer support surface are integrally formed of a single piece of plastic.

6. A belt tensioning bearing mount for use in a belt drive train which includes a housing, a drive shaft supported by bearings in the housing, a driven shaft supported in the housing by bearings and an inelastic belt passing over the drive shaft and the driven shaft, the bearing mount supporting at least one of the bearings and the bearing mount comprising: a bearing support surface, an outer portion mounted in the housing and at least one beam-like ligament connecting the bearing support surface to the outer portion, the ligament being elastically deflectable such that a bearing supported on the support surface and the shaft supported by such bearing can be elastically displaced from their static position in at least one direction to allow the inelastic belt to be passed around the shaft and wherein the tendency of the ligament to return to its static position tensions the belt.

7. A belt drive train comprising:
   a housing;
   a drive shaft;
   a driven shaft;
   an inelastic belt rotatably coupling the drive shaft and the driven shaft;
   at least two bearings supporting the drive shaft in the housing for rotation;
   at least two bearings supporting the driven shaft in the housing for rotation;
   at least one deflecting bearing mount for supporting at least one of the bearings, the deflecting bearing mount including a bearing support surface which is elastically movable relative to the housing;
   at least one of the bearings comprising a self-aligning sleeve bearing having a shaft support surface, an outer periphery and at least one beam-like member connecting the shaft support surface to the outer periphery so that the shaft support surface can deflect relative to the outer periphery to alter the alignment of the shaft support surface.

8. The drive train of claim 7, wherein the self aligning sleeve bearing is constructed of VESPEL TM.

9. The drive train of claim 7, wherein the self aligning bearing includes a single radially extending beam connecting the shaft support surface to the outer periphery.

10. The drive train of claim 9, wherein the shaft support surface of the self aligning sleeve bearing is split so as to allow thermo expansion of the shaft support surface.

11. The drive train of claim 9, wherein the shaft support surface of the sleeve bearing includes at least one groove to allow debris to be forced out of the interface between the shaft and the shaft support surface.

12. The drive train of claim 7, wherein the deflecting bearing mount comprises a mounting plate having an outer periphery, a shaft support surface and an elastically deflectable ligament connecting the shaft support surface to the outer periphery so as to allow movement of the shaft support surface relative to the housing.

13. The drive train of claim 7, further comprising a beater bar secured to the driven shaft and a motor for driving the driving shaft.

14. The drive train of claim 13, further comprising a driven pulley secured to the driven shaft and wherein the inelastic belt passes over the driven pulley to drive the driven shaft.

15. A self aligning one-piece bearing comprising: a substantially cylindrical shaft support surface, the shaft support surface being formed of plastic, at least one axially thin radially extending ligament integrally formed with the bearing support surface and extending radially out from the substantially cylindrical shaft support surface; and each ligament extending directly radially between the cylindrical shaft surface and the outer support surface and having a radial length equal to the radial distance between the shaft support surface and the outer support surface and an axial thickness which is less than the radial length wherein the shaft support surface is radially split at a point located circumferentially opposite each thin radial ligament and an outer support surface integrally formed with and supporting each axially thin ligament such that the shaft support surface is flexibly supported with respect to the outer support surface so that the shaft support surface can move with respect to the outer support surface to accommodate shaft misalignment and whereby the ligament supports the shaft support surface radially apart from the outer support surface.

16. The bearing of claim 15, wherein the bearing is formed of VESPEL TM polyamide thermoset plastic.

17. The bearing of claim 15, wherein the bearing is a sleeve bearing having a single bearing support surface and a single ligament that supports the bearing support surface on the outer support surface.

18. The bearing of claim 17, wherein the support surface of the bearing includes at least one axially extending groove to allow kicking out of debris during operation.

19. The bearing of claim 17, wherein the bearing support surface, the thin ligament and the outer support surface are integrally formed of a single piece of plastic.

20. The bearing of claim 15, wherein each of the radial ligaments have a substantially constant cross section.

* * * * *